United States Patent [19]

Denissen

[11] Patent Number: 5,440,548
[45] Date of Patent: Aug. 8, 1995

[54] MULTICAST PACKET GENERATION DEVICE FOR A PACKET SWITCHING TELECOMMUNICATION SYSTEM

[75] Inventor: Frank L. Denissen, Van Leriuslaan, Belgium

[73] Assignee: Alcatel N.V., Amsterdam, Netherlands

[21] Appl. No.: 36,477

[22] Filed: Mar. 24, 1993

[30] Foreign Application Priority Data

Mar. 27, 1992 [EP] European Pat. Off. ............ 92200870

[51] Int. Cl.$^6$ ............................................. H04L 12/56
[52] U.S. Cl. ....................................... 370/60; 370/94.1
[58] Field of Search ........................ 370/58.1, 60, 60.1, 370/94.1

[56] References Cited

U.S. PATENT DOCUMENTS

| | | | |
|---|---|---|---|
| 4,891,803 | 1/1990 | Huang et al. ........................ | 370/60 |
| 4,922,488 | 5/1990 | Niestegge ............................ | 370/60 |
| 5,138,613 | 8/1992 | Kudoh ................................. | 370/60 |
| 5,179,558 | 1/1993 | Thacker et al. ..................... | 370/60 |
| 5,210,743 | 5/1993 | Eilenberger et al. ............... | 370/60 |
| 5,229,991 | 7/1993 | Turner ................................. | 370/60 |
| 5,271,004 | 12/1993 | Proctor et al. ..................... | 370/60 |
| 5,305,311 | 4/1994 | Lyles ................................... | 370/60 |

FOREIGN PATENT DOCUMENTS

| | | |
|---|---|---|
| 0231967 | 8/1987 | European Pat. Off. . |
| 0315918 | 5/1989 | European Pat. Off. . |
| 0364955 | 4/1990 | European Pat. Off. . |
| 2238934 | 6/1991 | United Kingdom . |

OTHER PUBLICATIONS

"Design of a Broadcast Packet Network", J. Turner, *IEEE Infocom '86*, Apr. 8–10, 1986, pp. 667–675.

"A Recursive Multistage Structure for Multicast ATM Switching", R. Cusani et al, *Proceedings Volume 3, IEEE Infocom '91*, Bal Harbour, Florida, Apr. 9–11, 1991, pp. 1289–1295.

"Switching Network Architecture for ATM Based Broadband Communications", M. Henrion et al, *Proceedings, vol. V, International Switching Symposium*, Stockholm, May 27–Jun. 1, 1990, Session A7, Paper No. 1, pp. 1–9.

"ATM Multicast Connections Using the Gauss Switch", R. de Vries, *Conference Record vol. 1, IEEE Globecom '90*, San Diego, California, Dec. 2–5, 1990, pp. 0211, 0217.

*Primary Examiner*—Benedict V. Safourek
*Attorney, Agent, or Firm*—Ware, Fressola, Van Der Sluys & Adolphson

[57] ABSTRACT

A device (CP) to generate a number of multicast packets derived from a original packet applied at an input (I1/m) of a telecommunication system. The device has a device input (I) coupled to an input (I1/m) of the system and a device output (IN) connected to a single inlet (IN1/m) of a packet switching network (SN) also belonging to the system and coupled to outputs thereof. All the multicast packets are transmitted in series via the single device output (IN) so that only the corresponding single inlet (IN1/m) of the switching network (SN) is used for performing point-to-multipoint or multicast connections independently of the number of multicast packets to be derived from each original packet.

11 Claims, 3 Drawing Sheets

MULTICAST PACKET GENERATION DEVICE FOR A PACKET SWITCHING TELECOMMUNICATION SYSTEM

TECHNICAL FIELD

The present invention relates to a multicast packet generation device of a packet switching telecommunication system.

BACKGROUND OF THE INVENTION

Such a multicast packet generation device of a packet switching telecommunication system is already known in the art, e.g. from the article "Design of a Broadcast Packet network" of J. S. Turner published in the proceedings of IEEE INFOCOM'86—Fifth annual conference, Apr. 8-10, 1986 on "Computers and Communications Integrations, Designs, Analysis, Management", pages 667 to 675. Therein, the telecommunication system includes a multicast packet generation device which is constituted by a packet copy network and a plurality of broadcast and group translators.

The packet copy network has an architecture which is similar to that of a classical telecommunication packet switching network in that it has a plurality of inlets, a plurality of outlets and includes a plurality of interconnected switching elements. The inputs of the telecommunication system are coupled to respective inlets of the copy network and the outlets of the latter are each connected to a distinct broadcast and group translator. The output of each translator is connected to a distinct inlet of the switching network which is, in this case, constituted by the series connection of a packet distribution network and a packet routing network.

The difference between a classical switching network and the copy network is that the latter replicates any single original packet received at one of its inlets, i.e. at one input of the telecommunication system, and transfers each of these replica packets to a distinct one of its outlets, i.e. to a distinct broadcast and group translator. Moreover, the replica packets are merely distributed to all the outlets of the copy network. Since the replica packets received in the different translators are then all identical, each of these translators must either merely discard the replica packet if the latter is not needed or translating packet control data contained in the header of the replica packet into a packet identification and a routing information. The replica packets discarded by the translator are replica packets generated in excess by the copy network which, as already mentioned, systematically generates a maximum number of replica packets, this number corresponding to the number of outlets of the copy network and thus also to the number of translators. The packet identification is indicative of the communication, i.e. the input-output connection, to which the packet belong, and the routing information is indicative of the route to be followed by the packet through at least the switching network in order to exit at a single output of the telecommunication system.

The packet identification and the routing information form part of new packet control data which is associated by the translator to the replica packet. More particularly, this new packet control data is loaded in the header of the replica packet. The so-modified replica packet is then called multicast packet.

It is to be noted that each packet also contains user data and that this user data is the same for an original packet and all the multicast packets derived therefrom.

It is also to be noted that beside the routing information, the packet identification is necessary for distinguishing multicast packets which have to be transferred to a same output of the telecommunication system, i.e. which have the same routing information. This is for instance the case when a telecommunication concentrator is connected to this output and performs distribution of the packets, e.g. TV distribution, to different users connected to this concentrator.

A first drawback of this known multicast packet generation device is that the generation by the copy network of unneeded replica packets leads to unnecesary high traffic load.

Additionally, the control means of this known multicast packet generation device and more particularly of the broadcast and group translators thereof is relatively complex since it has to coordinate the operation of all these translators. Indeed, as mentioned above, each translator has either to discard the replica packet received therein or to translate the packet control data into particular routing information and packet identification.

Furthermore, the maximum number of multicast packets which will ever be requested has to be estimated for determining the number of outlets of the copy network. Because the copy network of the multicast packet generation device always generates this maximum number of replica packets, the same maximum number of translators are required as well as the same maximum number of inlets of the switching network needs to be reserved for performing multicast connections even when this maximum amount of multicast packets is not requested.

DISCLOSURE OF INVENTION

An object of the present invention is to provide a multicast packet generation device of the above known type but with a reduced traffic load and with a reduced number of inlets reserved in the switching network for performing multicast connections, while using relatively simple control means.

According to the invention, this object is achieved due to the fact that said multicast packet generation device has a device output connected to one of said inlets of said packet switching network and through which said multicast packets are transmitted in series.

In this way the control means of the multicast packet generation device is relatively simple because all the multicast packets are generated in this single device. Furthermore, only one inlet of the switching network needs to be reserved for all the multicast packets derived from a single original packet, whatever the number of required multicast packets. Since only the requested number of multicast packets is generated, the normal traffic load is not exceeded.

It is to be noted that a telecommunication system wherein the packet switching network is adapted to generate multicast packets while the packets are transferred therethrough is also known in the art. The switching nodes forming part of such a packet switching network are able to generate at least two multicast packets from each packet applied at one of their inputs and to supply these multicast packets at distincts ones of their outputs. Such a known telecommunication system does not require any additional separate multicast packet generation device but a drawback thereof is that almost all the switching nodes of the packet switching network have to be relatively "intelligent" and that the control thereof is thus relatively complex. Furthermore, because here again only one multicast packet can be provided at each output, the maximum number of possible multicast packets is limited by the number of outputs of the telecommunication system.

Another characteristic feature of the present invention is that original packets are applied at said input at an average input rate which is lower or equal to the output rate of said multicast packets at said device output divided by the number of multicast packets to be derived from each of said original packets.

In this way, no packet will be lost by the multicast packet generation device.

Also another characteristic feature of the present invention is that said multicast packet generation device includes memory means to store under the form of a linked list a plurality of said routing information and of said packet identification to be derived from packet control data.

The multicast packet generation device of the present invention is also characterized in that, if the number of multicast packets to be generated is equal to one, said original packet is transmitted through said multicast packet generation device without modification.

Indeed, in such cases of a single multicast packet, the packet control data associated to the original packet may for instance directly be used as packet identification and routing information for this multicast packet.

Also another characteristic feature of the present invention is that a multicast packet provided at an output of said telecommunication system is supplied back to an input of said telecommunication system in order to obtain additional multicast packets from a same original packet.

In this way, the number of multicast packets which can be derived from a single original packet according to the above defined rates may be increased.

Still according to the present invention, a plurality of multicast packet generation devices is provided, each multicast packet generation device being coupled between one input of said telecommunication system and one inlet of said packet switching network.

In an embodiment for increasing the number of multicast packets which can be derived from a single original packet, said plurality of multicast packet generation devices is coupled between a same input of said telecommunication system and a plurality of inlets of said packet switching network, the device output of each multicast packet generation device of said plurality being connected to a distinct one of said inlets.

The additional multicast packets derived from a same original packet are then no more dependent of possible packet loss in the switching network, i.e. the lost of the above multicast packet which is supplied back to an input of the telecommunication system. Furthermore, the delay for generating all the multicast packets is reduced because the additional multicast packets are no more derived from a multicast packet itself derived from an original packet, but are directly derived from this original packet.

The above mentioned and other objects and features of the invention will become more apparent and the invention itself will be best understood by referring to the following description of an embodiment taken in conjunction with the accompanying drawings.

BEST MODE FOR CARRYING OUT THE INVENTION

Figure 1:
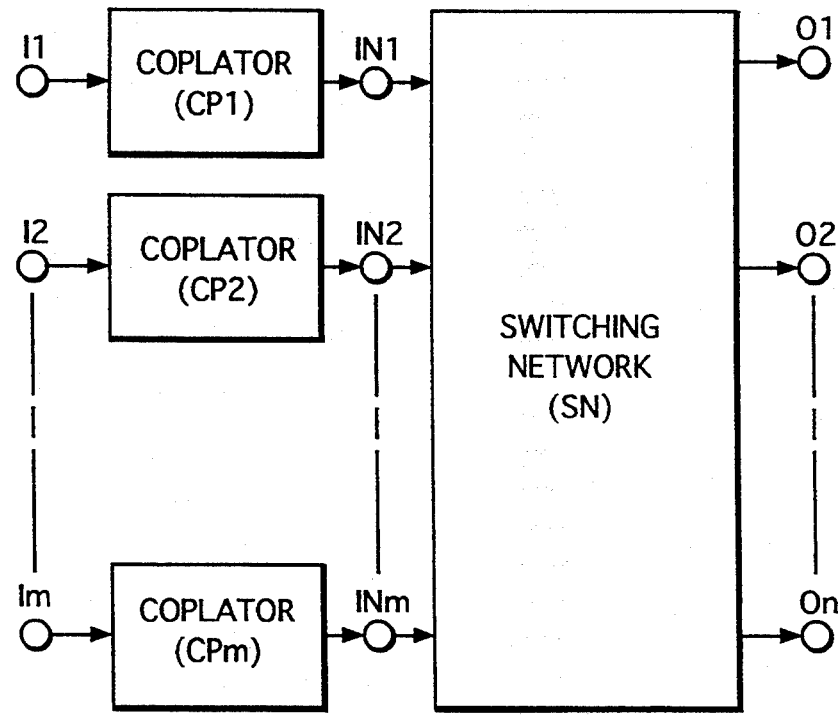
FIG. 1 represents a telecommunication system including a switching network SN and multicast packet generation devices CP1/m accoding to the invention.

The telecommunication system shown in FIG. 1 includes a classical packet switching network SN which may for instance be constituted by (not shown in detail) a distribution network connected in cascade with a routing network as described in the above mentioned article. This telecommunication system is adapted to perform single or "multicast" connections. A single connection is performed when an original packet is transmitted from a single input I1/m of the telecommunication system to a single output O1/n of this system. A multicast connection is performed when "copies" are made from a single original packet applied at an input I1/m and when these "copies", also called "multicast packets", are transferred either to distinct outputs O1/n or to a single output of this telecommunication system. The latter case occurring for instance when packet distribution, e.g. TV distribution, has to be performed toward different users which are all connected to a telecommunication concentrator, this concentrator being itself connected to a single output O1/n of the telecommunication system.

In order to perform multicast connections, the telecommunication system is provided with a plurality of multicast packet generation devices CP1/m also called "coplators" (for "packet COPy/header transLATORS"). Each of these coplators CP1/m has a device input I1/m connected to a like named input of the telecommunication system and has a device output IN1/m connected to a like named inlet of the switching network SN which has outlets O1/n connected to the respective like named outputs of the telecommunication system.

Each packet or information cell received at an input I1/m of the telecommunication system has a header and a data field. The header contains packet control data from which a packet identification and routing information can be derived. The packet identification is indicative of the communication, i.e. the input-output connection I1/m-O1/n, to which the packet belong, whilst the routing information is indicative of the destination of the packet, i.e. the identity or address of one or more outputs O1/n to which the packet has to be transferred and the route to be followed through the switching network. The data field contains user data which may be freely chosen by the user of the telecommunication system.

It is to be noted that in the above case of multicast packets which are derived from a same original packet which have to be transferred to a same output O1/n, these multicast packets all have the same routing information and user data and are thus only distinguished by their packet identification.

When a single connection has to be performed, the address of the single output O1/n to which the packet has to be transferred can generally directly be derived from the packet control data contained in the header of that packet. In that case, the packet is transmitted through the coplator CP1/m without modification. In other words, the coplator CP1/m operates as a transparent device for point-to-point connections. However in practice, when an input I1/m of the telecommunication system will only be used for point-to-point connections, a direct connection between the input I1/m and the corresponding inlet IN1/m is preferred to the use of a coplator CP1/m between these terminals.

When a multicast connection has to be performed, the coplator CP1/m derives, from a single original packet applied at its device input I1/m, a number of multicast packets. All these multicast packets have in their data field the same user data as that of the original packet applied at the device input but have in their header different packet control data which is derived from the packet control data of the original packet. Also the number of multicast packets to be generated may be derived from the packet control data contained in the header of the original packet.

It is to be noted that the packet control data of an original packet may indicate either a point-to-point connection or a point-to-multipoint connection whilst the packet control data of a multicast packet may only indicate a point-to-point connection. A point-to-point connection is a connection between a single input I1/m on a single output O1/n whilst a point-to-multipoint connection is a connection between a single input I1/m and several outputs O1/n.

As already mentioned the different multicast packets derived from a same original packet all start from a same input or device input I1/m at which this original packet applied and may end at a same or at different outputs O1/n of the telecommunication system. However, each coplator CP1/m generates the multicast packets in series and has a single device output IN1/m which is connected to a corresponding single inlet IN1/m of the switching network SN, whereby all the generated multicast packets are transmitted in series through this inlet. This means that even when the multicast packets have to be transferred to different outputs O1/n, they all pass through the same device output or inlet IN1/m.

Figure 4:
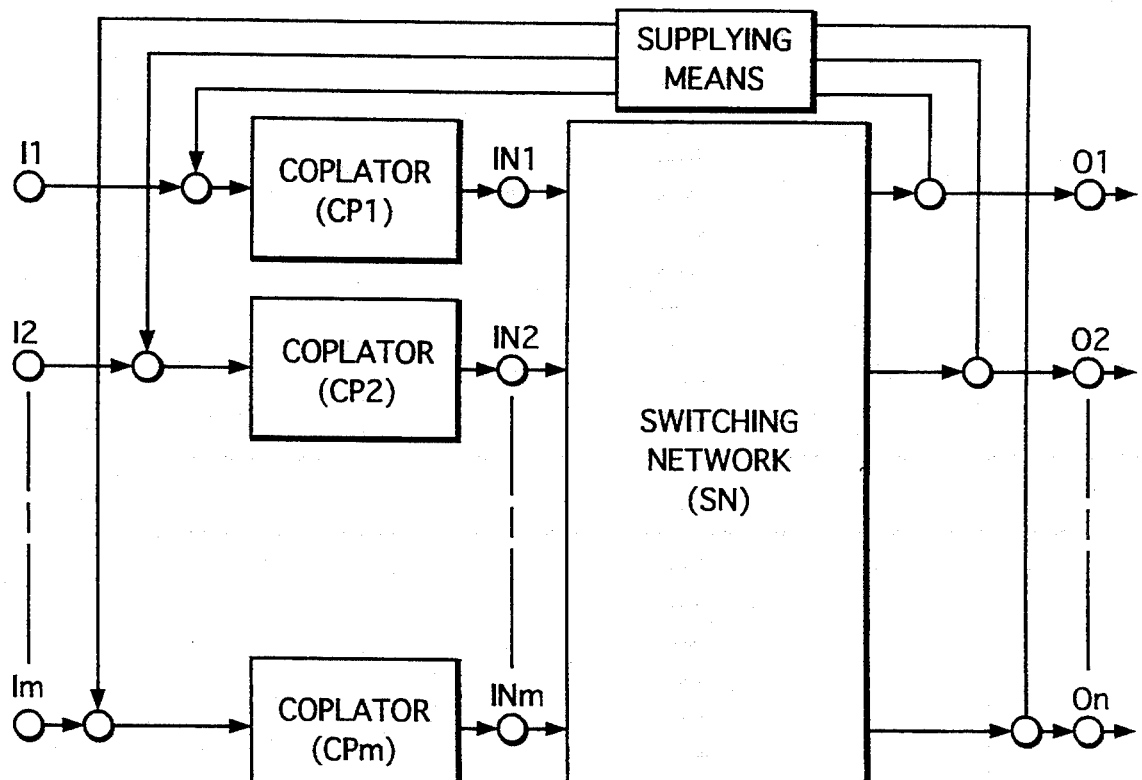
FIG. 4 shows a feature of the present invention in which a multicast packet provided at an output of the system may be supplied back to an input in order to obtain additional multicast packets from a same original packet.

To avoid blocking of the telecommunication system, the output rate of the multicast packets from a coplator CP1/m is at least equal to the average input rate of the original packets multiplied by the number of multicast packets to be derived from each incoming packet. For instance, if the average input rate of the original packets at the device input I1/m of a coplator CP1/m is of 30 Mbit/sec and when 5 multicast packets have to be derived from each incoming packet, the output rate of these multicast packets at the device output IN1/m is of 150 Mbit/sec. If these rates may not be exceeded but when additional multicast packets are requested, a possible solution, as shown in FIG. 4, is to re-inject at an input I1/m of the telecommunication system, i.e. at a device input I1/m of a coplator CP1/m, are of the multicast packets collected at an output O1/n of this telecommunication system. In this way, this multicast packet becomes an original packet as defined above and will be used to derive additional multicast packets therefrom.

Figure 5:
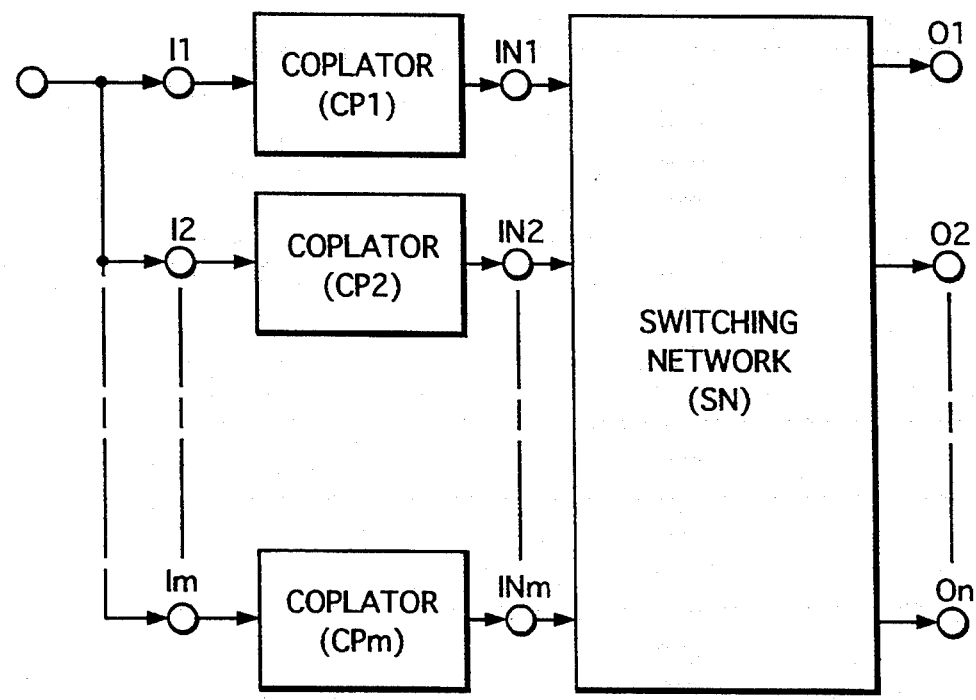
FIG. 5 shows another feature of the present invention for increasing the number of multicast packets which can be derived from a single original packet, wherein a plurality of coplators are coupled to the same input.

As shown in FIG. 5, two or more coplators CP1/m have their device inputs I1/m all connected to a same single input I1/m of the telecommunication system and have their device outputs IN1/m connected to distinct inlets IN1/m of the switching network SN. This embodiment has the advantage of providing the above additional multicast packets almost simultaneously with the other "normal" multicast packets, all derived from a same original packet, and to make the generation of the additional multicast packets independent of a possible packet loss in the switching network SN. Indeed, as the additional multicast packets are directly derived from the original packet and no more from one multicast packet which was already transferred through the switching network SN, the additional multicast packet are no more generated after the transfer delay of this one multicast packet through SN and are generated even if the one multicast packet is lost in the switching network SN.

Figure 2:
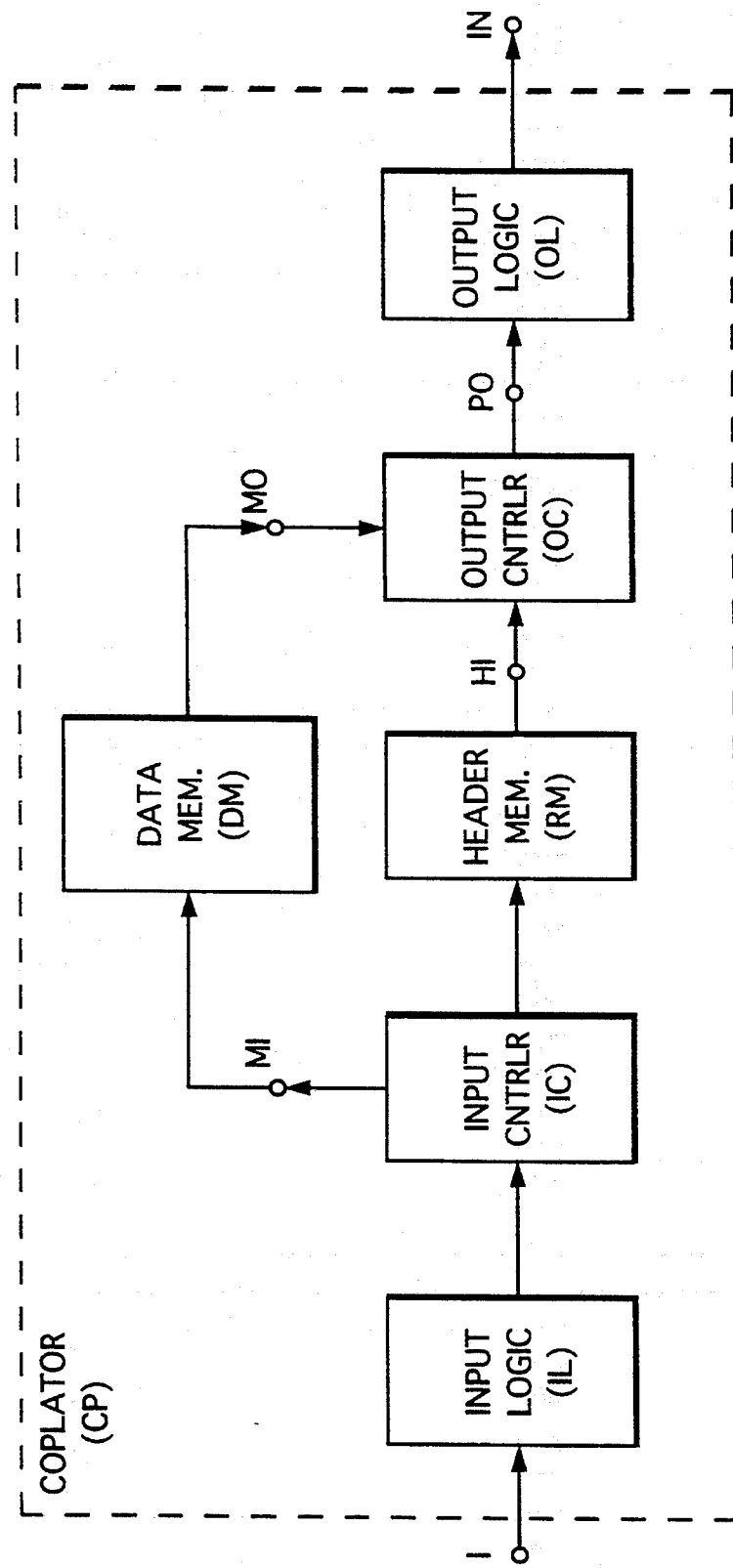
FIG. 2 shows a multicast packet generation device CP; CP1/m of Fig. 1 in more detail.

The coplator CP1/m operates as described below. In this following part of the description a coplator will generally be referred to as CP which may represent any of the coplators CP1/m of FIG. 1. CP is shown in detail in FIG. 2 and has a device input I and a device output IN corresponding to one of the device inputs I1/m and to one of the device outputs IN1/m of FIG. 1 respectively.

Referring again to FIG. 2, CP includes between its device input I and its device output IN the series connection of an input logic IL, an input controller IC, a header memory RM, a header terminal HI, an output controller OC, a packet terminal PO and an output logic OL. The coplator CP further includes a data memory DM of which a data input MI is connected to a like named second output of the input controller IC and of which a data output MO is connected to a like named data terminal of the output controller OC.

The input logic IL is a synchronization circuit which temporarily latches the incoming packets for correlating external timing with internal timing of the coplator CP.

The input controller IC checks the validity of the incoming packets. When a valid packet is received in IC, e.g. an original packet from which multicast packets have to be derived, the packet control data contained in the header of this original packet is transmitted to the header memory RM whilst the user data contained in the data field of this original packet is transmitted to the data memory DM via the output MI of IC.

Both the header memory RM and the data memory DM store the data received therein until these data are requested by the output controller OC.

The output controller OC generates the requested multicast packets from the original packet. To this end, OC derives from the packet control data then stored in RM new packet control data including a particular packet identification and a particular routing information for each multicast packet derived from a single original packet. Each derived packet control data is then loaded in the header of a distinct multicast packet generated by OC and of which the data field is loaded with the user data stored in the data memory DM and transmitted to OC via the data terminal MO. The successively generated multicast packets are then transmitted in series to the output logic OL via the packet terminal PO.

Similarly to the input logic IL, the output logic OL is a synchronization circuit which temporarily latches the multicast packets prior to release them to the switching network SN via the device output IN.

It is to be noted that the header memory RM and the data memory DM are able to store several packet control data and several user data respectively, these data belonging to different original packets.

Figure 3:
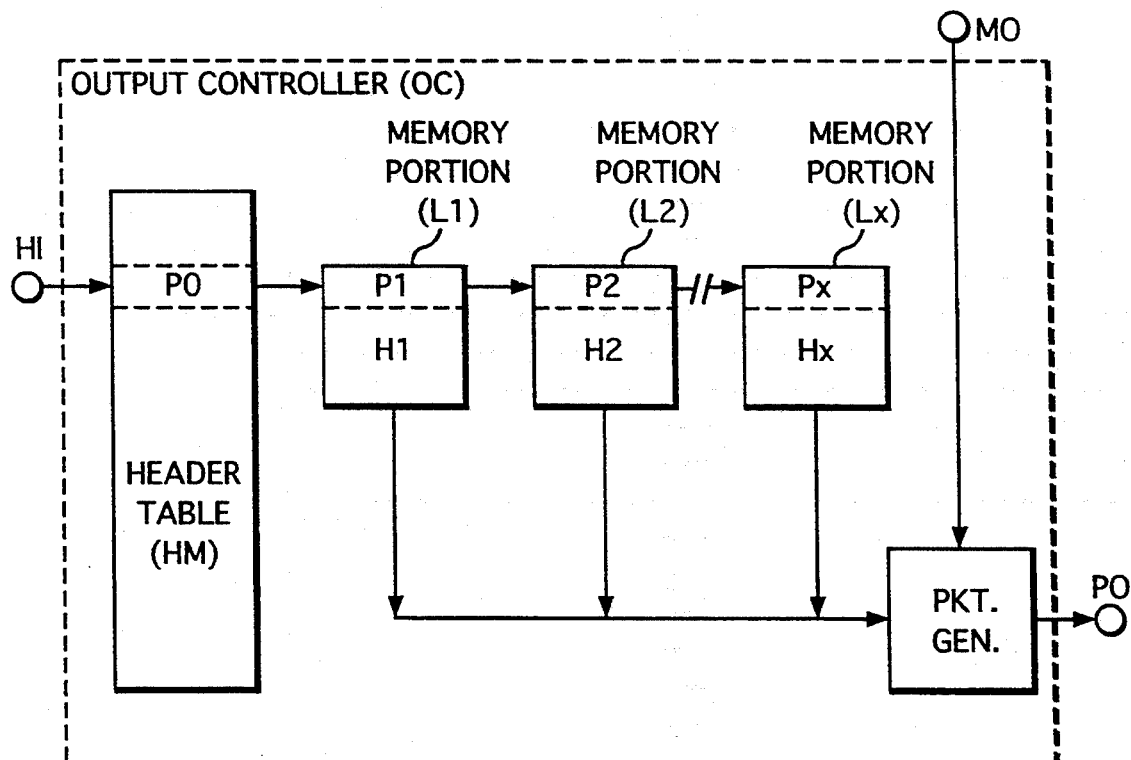
FIG. 3 shows an output controller OC forming part of the device CP of FIG. 2.

A possible embodiment of the output controller OC is shown in FIG. 3. In this embodiment the packet control data of the original packet is received via the header terminal HI and is used as a pointer in a header table HM. The data contained in the header table HM at the location indicated by the received packet control data is another pointer PO forming part of a linked list of pointers and packet control data. This linked list is schematically represented in FIG. 3 by memory portions L1, L2 and Lx, all these memory portions forming for instance part of the header table HM.

By pointing the memory portion L1, the pointer PO indicates a new pointer P1 as well as packet control data H1. This packet control data H1 is then transferred from the memory portion L1 to a packet generator PG also forming part of OC. Another input of this packet generator PG is constituted by the data terminal MO of the output controller OC. Upon receipt of the user data via the data terminal MO, PG generates a multicast packet having in its header the packet control data H1 received from L1 and in its data field the user data received from the data memory DM. This multicast packet generated by PG is then transmitted to the output logic OL via an output of the packet generator PG which is connected to the packet terminal PO.

The pointer P1 of the memory portion L1 points to another memory portion L2 containing another pointer P2 and other packet control data H2. With this other packet control data H2, the packet generator PG generates another multicast packet which still carries the same user data in its data field. This other multicast packet is then also transmitted to OL as described before.

All the multicast packets to be derived from an original packet received in the coplator CP are generated as described above.

The last multicast packet to be derived from an original packet is detected by the fact that the pointer Px contained in its corresponding memory portion Lx indicates the end of the linked list, e.g. because the pointer Px has a predetermined code. The packet control data Hx contained in this last memory portion Lx of the linked list is however valid and is used for generating the last multicast packet to be derived from the original packet as described above.

In this way, the requested amount of multicast packets is derived from an original packet without explicitely knowing the number of multicast packets to be generated.

While the principles of the invention have been described above in connection with specific apparatus, it is to be clearly understood that this description is made only by way of example and not as a limitation on the scope of the invention.

I claim:

1. A telecommunication system having at least one system input (I; I1/m) and a plurality of system outputs (O1/n) and including a plurality of multicast packet generation devices (CP1/m) and a packet switching network (SN), said packet switching network having a plurality of network inlets (IN1/m) and a plurality of network outlets (O1/n), each of said network outlets (O1/n) respectively corresponding to one of said system outputs (O1/n), each of said multicast packet generation devices having a single inlet corresponding to one of said system inputs and a single outlet connected to one of said network inlets, each of said multicast packet generation device being adapted to derive a plurality of distinct multicast packets from an original packet applied to said single inlet and to transmit said multicast packets in series to said single outlet, and said switching network being adapted to control the transfer of each of said multicast packets from any one of said network inlets to any one of said network outlets.

2. A telecommunication system according to claim 1, wherein original packets are applied at said single input (I; I1/m) of each multicast packet generation device at an average input rate which is lower or equal to the output rate of said multicast packets at said output (IN; IN1/m) divided by the number of multicast packets to be derived from each of said original packets wherein said multicast packet generation devices (CP; CP1/m) includes means for increasing said lower or equal average input rate to said output rate.

3. A telecommunication system according to claim 2, wherein each of said multicast packet generation devices (CP; CP1/m) includes means for deriving from said packet control data the number of multicast packets to be generated.

4. A telecommunication system according to claim 2, wherein a multicast packet provided at one of said system outputs (O1/n) is supplied back by supplying means of said telecommunication system to an input (I1/m) of said telecommunication system in order to obtain additional multicast packets from a same original packet.

5. A telecommunication system according to claim 1, wherein said original packet has associated packet control data from which each of said multicast packet generation devices (CP; CP1/m) derives, by deriving means, for each of said multicast packets, a routing information indicative of the identity of said network outlet (O1/n) to which said multicast packet has to be transferred, and a packet identification indicative of the communication to which the multicast packet belongs, both said routing information and said packet identification being included in said multicast packet by said multicast packet generation device (CP; CP1/m).

6. A telecommunication system according to claim 5, wherein each of said multicast packet generation devices (CP; CP1/m) includes memory means (HM) to store under the form of a linked list (L1, L2, Lx; P0, P1, P2, Px) a plurality of said routing information and of said packet identification (HI, H2, Hx) derived from packet control data.

7. A telecommunication system according to claim 5, wherein each of said original packets and each of said multicast packets includes a header and a data field, that the header of an original packet contains said packet control data, that the header of each of the multicast packets derived from said original packet contains said routing information and said packet identification, and that the data field of said original packet and of said multicast packets contains the same user data.

8. A telecommunication system according to claim 5, wherein each of said multicast packet generation devices includes means for determining that all the multicast packets derived from a same original packet have to be transferred to a same network outlet (O1/n) and associating a same routing information but a distinct packet identification with each of said multicast packets.

9. A telecommunication system according to claim 5, wherein said multicast packet generation device (CP; CP1/m) includes means for deriving from said packet control data the number of multicast packets to be generated.

10. A telecommunication system according to claim 1, wherein a plurality of multicast packet generation devices (CP1/m) is provided, each multicast packet generation device being coupled between one input (I1/m) of said telecommunication system and one inlet (IN1/m) of said packet switching network (SN).

11. A telecommunication system according to claim 1, wherein said plurality of multicast packet generation devices is coupled between a same system input (I1/m) of said telecommunication system and a plurality of said network inlets (IN1/m) of said packet switching network (SN), the single output (IN1/m) of each multicast packet generation device being connected to a distinct one of said network inlets (IN1/m).

* * * * *